(12) United States Patent
Bower, III et al.

(10) Patent No.: US 11,677,628 B2
(45) Date of Patent: Jun. 13, 2023

(54) TOPOLOGY DISCOVERY BETWEEN COMPUTE NODES AND INTERCONNECT SWITCHES

(71) Applicant: LENOVO ENTERPRISE SOLUTIONS (SINGAPORE) PTE. LTD., Singapore (SG)

(72) Inventors: Fred A. Bower, III, Durham, NC (US); Caihong Zhang, Shanghai (CN); Xiao Dong Du, Shanghai (CN); Patrick L. Caporale, Cary, NC (US); Jeffrey R. Hamilton, Pittsboro, NC (US); James J. Parsonese, Cary, NC (US); Pravin Patel, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 727 days.

(21) Appl. No.: 15/839,536

(22) Filed: Dec. 12, 2017

(65) Prior Publication Data

US 2019/0182117 A1 Jun. 13, 2019

(51) Int. Cl.
*H04L 41/12* (2022.01)
*H04L 49/00* (2022.01)
*H04L 49/15* (2022.01)

(52) U.S. Cl.
CPC .............. *H04L 41/12* (2013.01); *H04L 49/15* (2013.01); *H04L 49/30* (2013.01); *H04L 49/70* (2013.01)

(58) Field of Classification Search
CPC ......... H04L 41/12; H04L 49/70; H04L 49/30; H04L 49/15
See application file for complete search history.

(56) References Cited

U.S. PATENT DOCUMENTS

| | | | |
|---|---|---|---|
| 2004/0193705 A1* | 9/2004 | To | H04L 45/28 709/223 |
| 2009/0092141 A1* | 4/2009 | Banerjee | H04L 49/354 370/397 |
| 2014/0362709 A1* | 12/2014 | Kashyap | H04L 41/12 370/250 |
| 2015/0358254 A1* | 12/2015 | Zheng | H04L 49/357 370/355 |
| 2017/0126555 A1* | 5/2017 | Kamble | H04L 49/70 |

* cited by examiner

*Primary Examiner* — Dady Chery

(57) ABSTRACT

Topology discovery between compute nodes and interconnect switches including creating, on an interconnect switch, a virtual topology discovery device for a first port, wherein the interconnect switch is coupled to a compute node via the first port, and wherein the virtual topology discovery device comprises a port identifier for the first port; mapping the virtual topology discovery device to the first port; receiving an inventory request from the compute node via the first port; routing the inventory request to the virtual topology discovery device for the first port; and sending, from the virtual topology discovery device for the first port, the port identifier to the compute node.

19 Claims, 5 Drawing Sheets

TOPOLOGY DISCOVERY BETWEEN COMPUTE NODES AND INTERCONNECT SWITCHES

BACKGROUND

Field of the Invention

The field of the invention is data processing, or, more specifically, methods, apparatus, and products for topology discovery between compute nodes and interconnect switches.

Description of Related Art

Many data centers employ a number of different devices connected to each other in complex configurations. However, each connection may not be properly identified by the connected devices. Consequently, management agents may not have an accurate overview of the exact links between and among devices and switches. Management agents in such systems may operate more effectively with an accurate assessment of these connections.

SUMMARY

Methods, systems, and apparatus for topology discovery between compute nodes and interconnect switches are disclosed in this specification. Topology discovery between compute nodes and interconnect switches includes creating, on an interconnect switch, a virtual topology discovery device for a first port, wherein the interconnect switch is coupled to a compute node via the first port, and wherein the virtual topology discovery device comprises a port identifier for the first port; mapping the virtual topology discovery device to the first port; receiving an inventory request from the compute node via the first port; routing the inventory request to the virtual topology discovery device for the first port; and sending, from the virtual topology discovery device for the first port, the port identifier to the compute node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
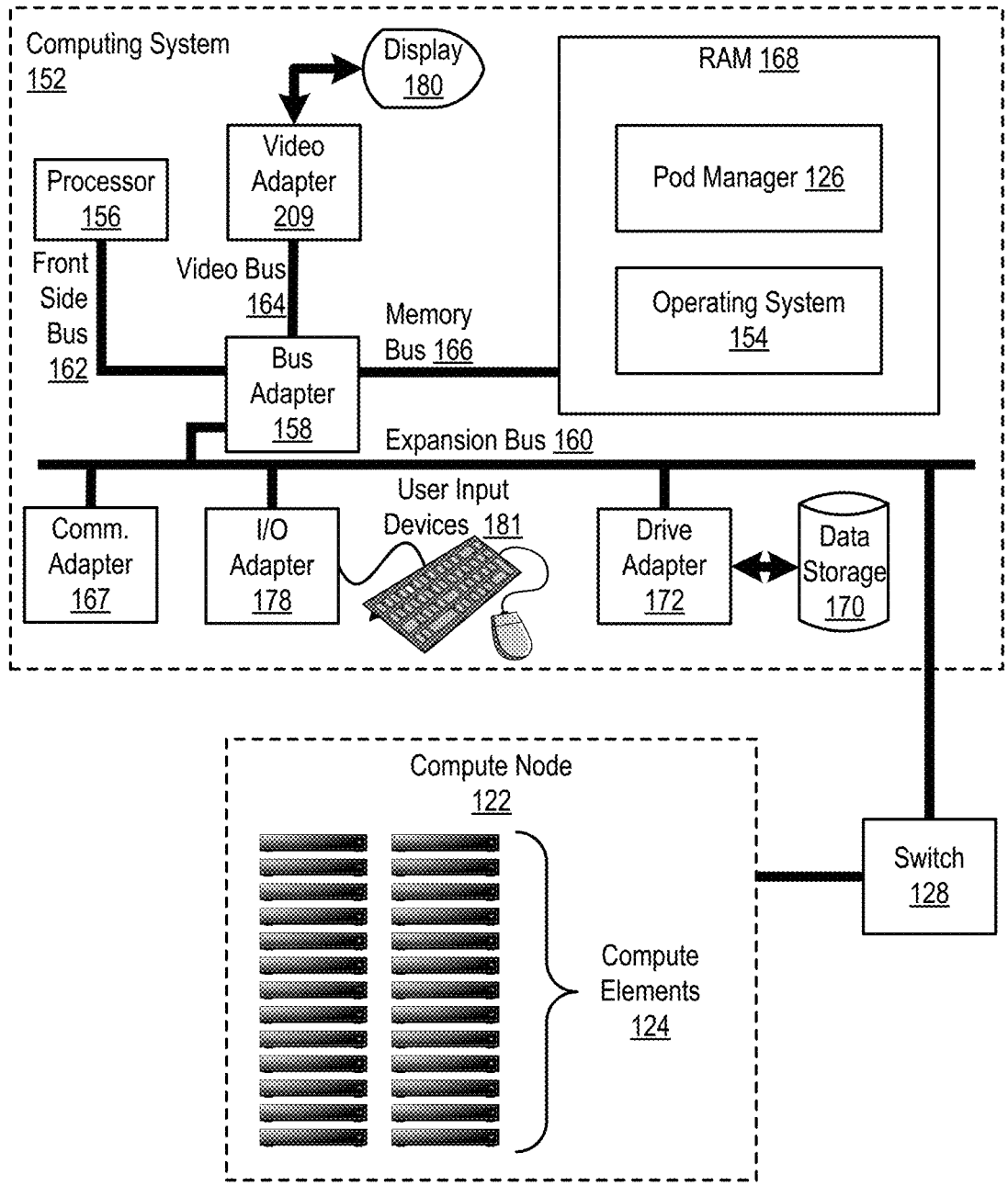
FIG. 1 sets forth a block diagram of an example system configured for topology discovery between compute nodes and interconnect switches according to embodiments of the present invention.

Exemplary methods, apparatus, and products for topology discovery between compute nodes and interconnect switches in accordance with the present invention are described with reference to the accompanying drawings, beginning with FIG. 1. FIG. 1 sets forth a block diagram of automated computing machinery comprising an exemplary computing system (152) configured for topology discovery between compute nodes and interconnect switches according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for topology discovery between compute nodes and interconnect switches according to embodiments of the present invention include UNIX™, Linux™, Microsoft Windows™, AIX™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and part of the operating system is a pod manager (126), a module of computer program instructions for topology discovery between compute nodes and interconnect switches.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for topology discovery between compute nodes and interconnect switches according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for topology discovery between compute nodes and interconnect switches according to embodiments of the present invention include modems for wired dial-up communications, Ethernet (IEEE 802.3) adapters for wired data communications, and 802.11 adapters for wireless data communications.

The expansion bus (160) of the exemplary computing system (152) of FIG. 1, which may be an interconnect fabric, is also connected to a compute node (122) via a switch (128). The compute node (122) is a collection of compute elements (124) able to be arranged (i.e., composed) into different configurations based on the data center requirements. The compute elements (124) are modules of computer hardware and software used to create composed systems. The compute modules (124) may be devices that perform one or more functions within a computing system. Examples of compute elements (124) include processing units, memory, communications adapters, I/O adapters, drive adapters, and storage devices such as platter drives and solid state drives. The compute node (122) may be a set of computing elements configured based on the Rack Scale Design platform. Further, the compute node (122) may be coupled to the expansion bus (160) via a switch (128) as shown in FIG. 1, or via another adapter, such as communications adapter (167).

Figure 2:
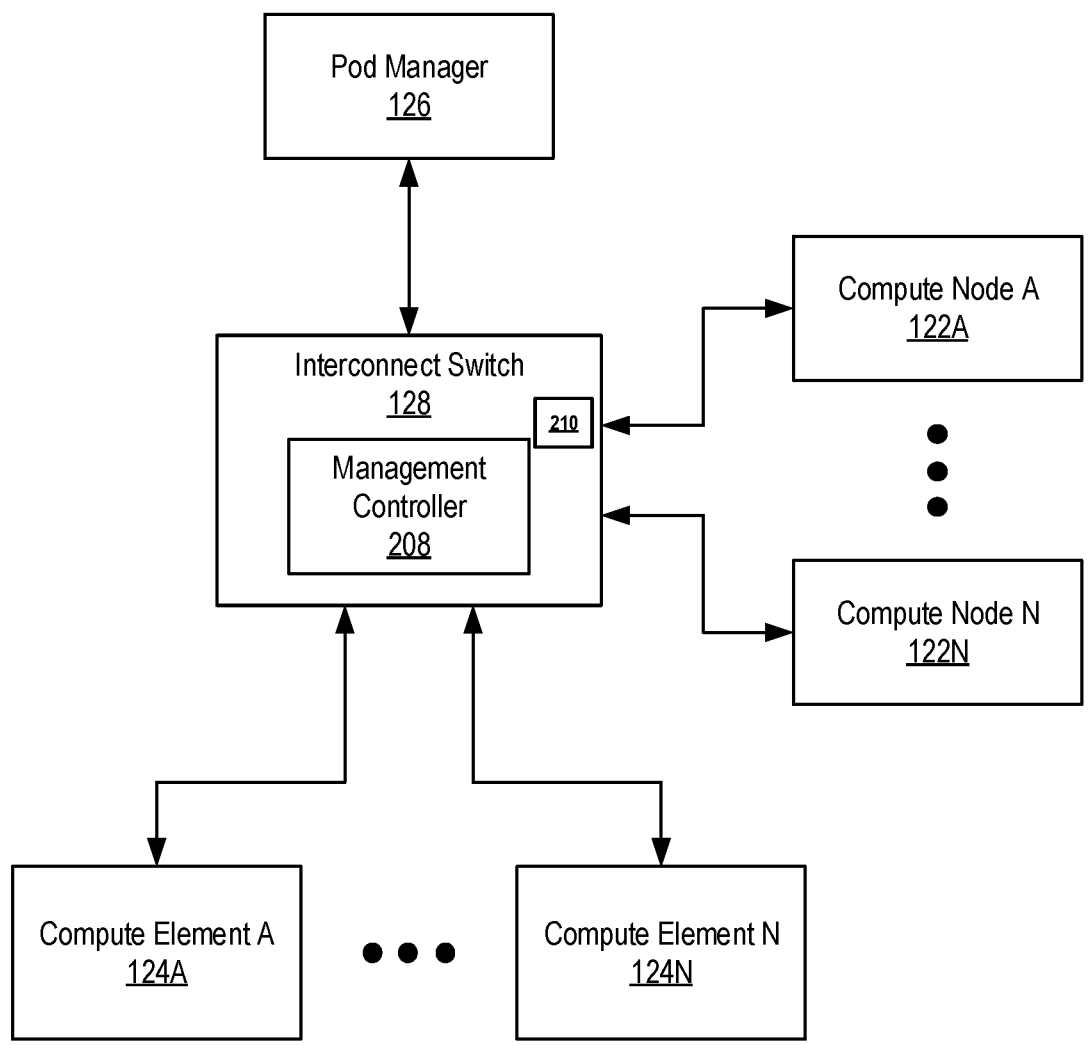
FIG. 2 sets forth a block diagram for topology discovery between compute nodes and interconnect switches according to embodiments of the present invention.

FIG. 2 is an example block diagram of a system configured for topology discovery between compute nodes and interconnect switches. FIG. 2 includes a pod manager (126) coupled to an interconnect switch (128). Also, coupled to the interconnect switch (128) via an interconnect fabric are multiple compute nodes (compute node A (122A), compute node N (122N)) and multiple compute elements (compute element A (124A), compute element N (124N)). The interconnect switch (128) includes a management controller (208).

A composed system is a collection of compute elements (compute element A (124A), compute element N (124N)) and/or compute nodes (compute node A (122A), compute node N (122N)) communicatively coupled together (i.e., composed) to form a computing system capable of executing a workload. A composed system may include, for example, compute elements such as a processor, memory, storage, and an I/O controller, each coupled to one another using an interconnect fabric. A composed system may include compute elements (compute element A (124A), compute element N (124N)) from different compute nodes (compute node A (122A), compute node N (122N)).

A pod is group of compute nodes (compute node A (122A), compute node N (122N)) and compute elements (compute element A (124A), compute element N (124N)) used to create composed systems. Each compute node (compute node A (122A), compute node N (122N)) and compute element (compute element A (124A), compute element N (124N)) within the pod that is able to be composed into a composed system is referred to as being composable. The pod of composable compute elements and composable compute nodes includes the composed systems. For example, a pod may include three compute nodes—compute node A, compute node B, and compute node C. Each compute node may include a processor, memory, storage, and an I/O controller. One composed system may be composed from the processor on compute node A, the memory and storage on compute node B, and the I/O controller on compute node C.

The pod manager (126) is software, hardware, or an aggregation of both software and hardware that composes and manages composed systems. The pod manager (126) manages and configures composed systems made up of compute nodes (compute node A (122A), compute node N (122N)) and/or compute elements (compute element A (124A), compute element N (124N)). The pod manager (126) may instruct the management controller (208) to add or remove a communications coupling on the interconnect fabric between compute nodes (compute node A (122A), compute node N (122N)) and compute elements (compute element A (124A), compute element N (124N)) to create or modify a composed system.

The interconnect switch (128) is a bridge between the compute elements (compute element A (124A), compute element N (124N)) and the compute nodes (compute node A (122A), compute node N (122N)), creating a potential communicative coupling between each compute element (compute element A (124A), compute element N (124N)) and each compute node (compute node A (122A), compute node N (122N)) in the system. The interconnect switch (128) connects to each compute node (compute node A (122A), compute node N (122N)) and compute element (compute element A (124A), compute element N (124N)) via an interconnect fabric. The interconnect fabric is a device or group of devices that transfers data between compute elements (compute element A (124A), compute element N (124N)) and compute nodes (compute node A (122A), compute node N (122N)) on the system. The interconnect fabric may be a switching fabric such as a Peripheral Component Interconnect Express (PCIe), Infiniband, Omni-Path, or Ethernet network. Further, as used herein, interconnect switch may refer to an interconnect switch enclosure that includes the management controller (208) and the compute elements (compute element A (124A), compute element N (124N)).

Each compute element (compute element A (124A), compute element N (124N)) and compute node (compute node A (122A), compute node N (122N)) coupled to the interconnect switch (128) may be associated with a different port on the interconnect fabric. A port is a data path on the interconnect fabric between the interconnect switch (128) and the devices (physical or virtual) coupled to the interconnect switch, such as the compute elements (compute element A (124A), compute element N (124N)) and compute nodes (compute node A (122A), compute node N (122N)). Each port may connect a single device to the interconnect switch (128). Further, the ports may be physically separated from one another (e.g., different physical wires on the interconnect fabric) or virtually separated from one another (e.g., each data packet associated with, or addressed to, a specific port).

The management controller (208) is software, hardware, or an aggregation of both software and hardware that manages and configures the interconnect switch (128) and element within the interconnect switch enclosure. The management controller (208) communicates with the pod manager (126) to provide the pod manager (126) with information about the interconnect switch, compute elements (compute element A (124A), compute element N (124N)), and compute nodes (compute node A (122A), compute node N (122N)). The management controller (208) also carries out the instructions received from the pod manager (126), including configuring the composition of the composed systems from the compute elements (compute element A (124A), compute element N (124N)) and compute nodes (compute node A (122A), compute node N (122N)) (e.g., by mapping or unmapping compute elements to or from other compute elements or compute nodes).

The management controller (208) may also monitor the resource utilization of each compute element (compute element A (124A), compute element N (124N)) coupled to the interconnect switch (128). The management controller (208) may send information about the resource utilization to the pod manager (126). Resource utilization information may include, for example, percentage utilized (e.g., percentage of processor utilization, percentage of storage or memory utilized, etc.), compute element temperature, and I/O generated to and from the compute element.

The compute elements (compute element A (124A), compute element N (124N)) are modules of computer hardware and software used to create composed systems. The compute elements (compute element A (124A), compute element N (124N)) may be endpoints on the interconnect fabric. Compute elements (compute element A (124A), compute element N (124N)) may include hardware compute elements such as processors, accelerators, memory, storage, and I/O controllers. Compute elements (compute element A (124A), compute element N (124N)) may also include software compute elements, such as virtualized hardware instantiated to share a single hardware compute element across multiple composed systems.

The compute elements (compute element A (124A), compute element N (124N)) make up a resource pool for use by the compute nodes (compute node A (122A), compute node N (122N)). The resource pool of compute elements is the collection of each compute element (compute element A (124A), compute element N (124N)). Each composed system may be composed from a compute node (compute node A (122A), compute node N (122N)) mapped to subset of the compute elements (compute element A (124A), compute element N (124N)) in the resource pool.

Upon powering up, each compute node (compute node A (122A), compute node N (122N)) coupled to the interconnect switch (128) may lack information about the device or devices on the other end of the interconnect fabric, other than the existence of the interconnect switch (128). During this discovery stage, the management controller (208) may create a virtual topology discovery device (210) for each port on the interconnect switch (128) that provides, to the coupled compute nodes (compute node A (122A), compute node N (122N)), inventory information about the interconnect switch and port to which the compute node is coupled. The compute nodes (compute node A (122A), compute node N (122N)) may then provide this information to the pod manager (126) allowing the pod manager (126) greater visibility of the configuration of compute nodes (compute node A (122A), compute node N (122N)) and compute elements (compute element A (124A), compute element N (124N)) in order to compose systems from the available devices.

Figure 3:
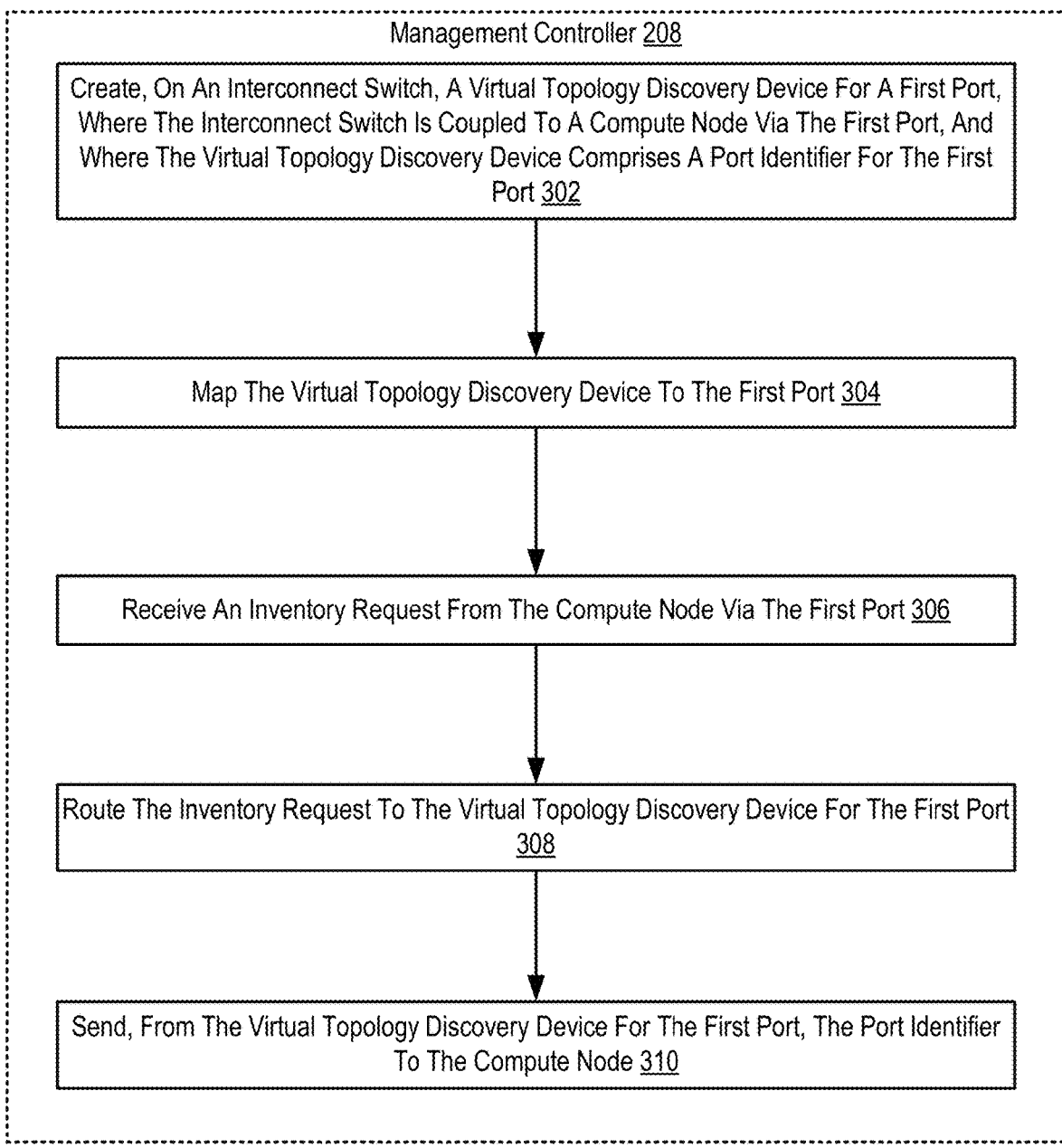
FIG. 3 sets forth a flow chart illustrating an exemplary method for topology discovery between compute nodes and interconnect switches according to embodiments of the present invention.

For further explanation, FIG. 3 sets forth a flow chart illustrating an exemplary method for topology discovery between compute nodes and interconnect switches according to embodiments of the present invention that includes creating (302), on an interconnect switch, a virtual topology discovery device for a first port, wherein the interconnect switch is coupled to a compute node via the first port, and wherein the virtual topology discovery device comprises a port identifier for the first port. Creating (302), on an interconnect switch, a virtual topology discovery device for a first port, wherein the interconnect switch is coupled to a compute node via the first port, and wherein the virtual topology discovery device comprises a port identifier for the first port may be carried out by instantiating or activating the virtual topology discovery device on the interconnect switch or management controller (208).

The virtual topology discovery device is software, hardware, or an aggregation of both software and hardware that provides inventory information about the coupling between a device and the interconnect switch. The virtual topology discovery device may include inventory information about the interconnect switch and coupling between the interconnect switch and a device, such as a compute node. The virtual topology discovery device may provide, to a requesting device, a port identifier for the port, on the interconnect switch, to which the device is coupled. The port identifier is information that identifies one port among a group of ports. The port identifier may be a port number or other designation decipherable by the compute node or pod manager.

The virtual topology discovery device may be a function within the firmware for the interconnect switch or may be a function within the firmware for the management controller (208) within the interconnect switch or switch enclosure. The virtual topology discovery device may be one of a plurality of virtual topology discovery devices on the interconnect switch or switch enclosure. Further, each of the plurality of virtual topology discovery devices may be associated with a different port of the interconnect switch.

The virtual topology discovery device may appear as an endpoint to the compute node coupled to the first port. The virtual topology discovery device may appear indistinguishable from other compute elements attached to the communications fabric. The virtual topology discovery device may also include other information in addition to the port identifier. The virtual topology discovery device may include information about the interconnect switch, such as a switch identifier (e.g., make, model, serial number), a version of the firmware executing on the interconnect switch, and available endpoints, such as compute nodes, within the switch enclosure or downstream from the interconnect switch.

The method of FIG. 3 further includes mapping (304) the virtual topology discovery device to the first port. Mapping (304) the virtual topology discovery device to the first port may be carried out by creating an association between the virtual topology discovery device and the first port. Specifically, mapping (304) the virtual topology discovery device to the first port virtual may include configuring the interconnect switch to direct requests from the compute node on the first port to the virtual topology discovery device.

The method of FIG. 3 further includes receiving (306) an inventory request from the compute node via the first port. Receiving (306) an inventory request from the compute node via the first port may be carried out by the compute node sending the inventory request to the interconnect switch via the port. The inventory request may be a connection test to determine whether any device exists on the other end of the interconnect fabric from the compute node.

The method of FIG. 3 further includes routing (308) the inventory request to the virtual topology discovery device for the first port. Routing (308) the inventory request to the virtual topology discovery device for the first port may be carried out by directing the inventory request to the virtual topology discovery device based on the port upon which the inventory request was received. The interconnect switch or management controller (208) may include multiple virtual topology discovery devices, each mapped to different ports. The management controller (208) may select the virtual topology discovery device mapped to the port to route the inventory request. Alternatively, the interconnect switch may automatically rout the inventory request to the virtual topology discovery device mapped to the port based on the mapping between the port and the virtual topology discovery device.

The method of FIG. 3 further includes sending (310), from the virtual topology discovery device for the first port, the port identifier to the compute node. Sending (310), from the virtual topology discovery device for the first port, the port identifier to the compute node may be carried out by the virtual topology discovery device in response to receiving the inventory request. The virtual topology discovery device may initiate a transfer of data that includes the port identifier for transmission across the interconnect fabric to the compute node.

For example, upon powering on, the interconnect switch may enter a discovery stage. During the discovery stage, the management controller (208) may create a virtual topology discovery device for each port on the interconnect switch connected to a compute node. Each virtual topology discovery device may be mapped to a different port and include inventory information about the port and interconnect switch. A compute node coupled to a first port may send an inventory request to the interconnect switch, and the interconnect switch routes that request to the virtual topology discovery device for the first port. The virtual topology discovery device responds by sending a port identifier to the compute node. Previous to receiving the port identifier, the compute node may have been unaware of the port on the interconnect switch to which the compute node is coupled. Once the compute node receives the port identifier, the compute node may send the port identifier to the pod manager. The pod manager may then be able to correlate the information about to which ports the compute nodes are connected in order to generate an accurate topology of the pod.

Figure 4:
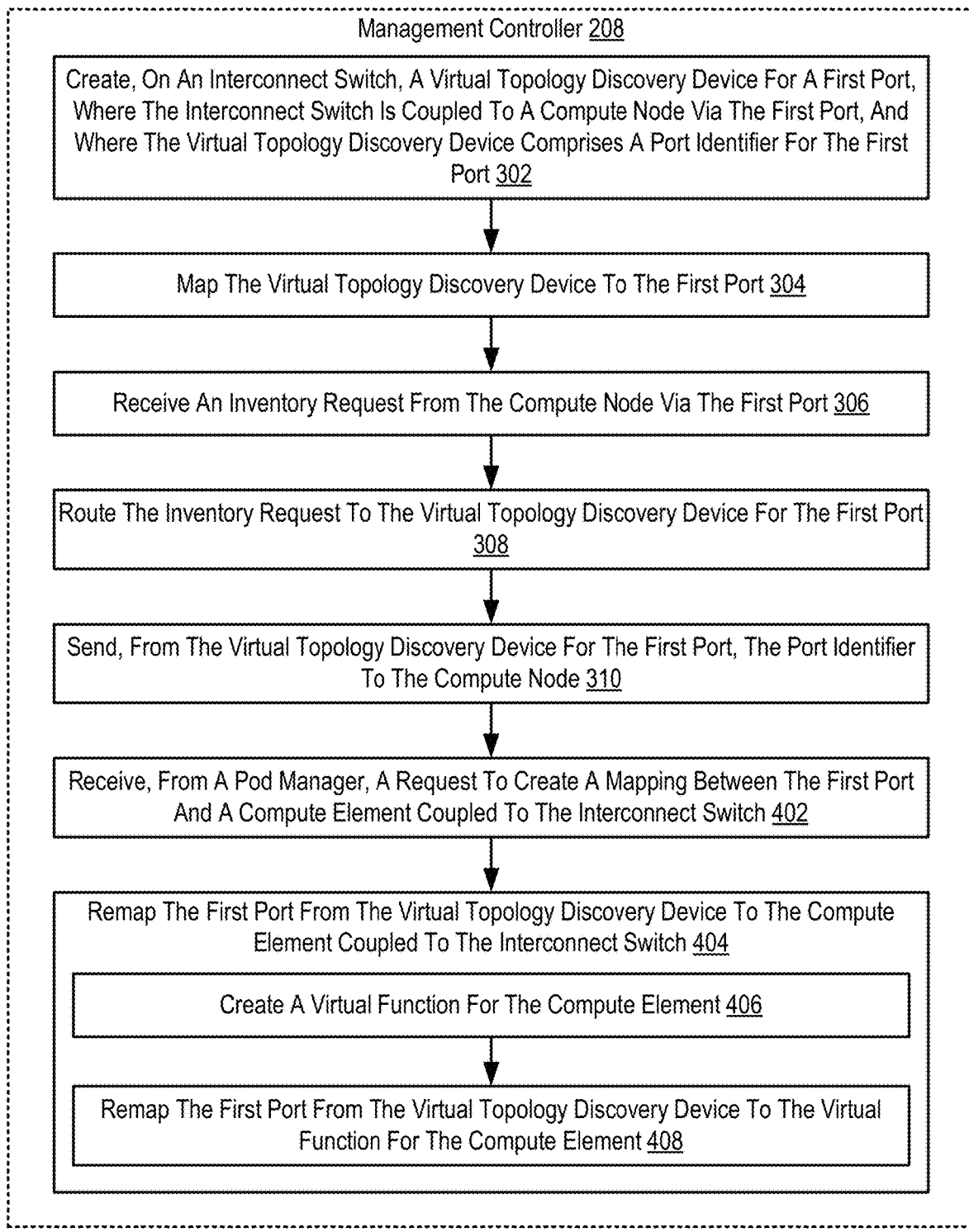
FIG. 4 sets forth a flow chart illustrating an exemplary method for topology discovery between compute nodes and interconnect switches according to embodiments of the present invention.

For further explanation, FIG. 4 sets forth a flow chart illustrating a further exemplary method for topology discovery between compute nodes and interconnect switches according to embodiments of the present invention that includes creating (302), on an interconnect switch, a virtual topology discovery device for a first port, wherein the interconnect switch is coupled to a compute node via the first port, and wherein the virtual topology discovery device comprises a port identifier for the first port; mapping (304) the virtual topology discovery device to the first port; receiving (306) an inventory request from the compute node via the first port; routing (308) the inventory request to the virtual topology discovery device for the first port; and sending (310), from the virtual topology discovery device for the first port, the port identifier to the compute node.

The method of FIG. 4 differs from the method of FIG. 3, however, in that the method of FIG. 4 further includes receiving (402), from a pod manager, a request to create a mapping between the first port and a compute element coupled to the interconnect switch; and remapping (404) the first port from the virtual topology discovery device to the compute element coupled to the interconnect switch.

Receiving (402), from a pod manager, a request to create a mapping between the first port and a compute element coupled to the interconnect switch may be carried out by the management controller receiving a request as part of the composing of a composed system. The request may be received during a configuration stage, which may be subsequent to the discovery stage.

Remapping (404) the first port from the virtual topology discovery device to the compute element coupled to the interconnect switch may be carried out by disabling a communicative coupling between the compute node coupled to the first port and the virtual topology discovery device, and enabling a communicative coupling between the compute node coupled to the first port and the compute element. Upon remapping the first port from the virtual topology discovery device to the compute element coupled to the interconnect switch, messages sent from the compute node on the first port will be directed to the compute element.

Remapping (404) the first port from the virtual topology discovery device to the compute element coupled to the interconnect switch may also be carried out by creating (406) a virtual function for the compute element; and remapping (408) the first port from the virtual topology discovery device to the virtual function for the compute element.

Creating (406) a virtual function for the compute element may be carried out by generating, initializing, or accessing a virtual function for a physical function. A virtual function is an addressable entity that shares physical resources implemented by a physical function. A virtual function is utilized to share a single physical resource across a number of separate systems, such as composed systems. The compute element may be accessible by the compute node using a virtual function on the interconnect switch or interconnect switch enclosure.

Remapping (408) the first port from the virtual topology discovery device to the virtual function for the compute element may be carried out by disabling a communicative coupling between the compute node coupled to the first port and the virtual topology discovery device, and enabling a communicative coupling between the compute node coupled to the first port and the virtual function for the compute element. Upon remapping (408) the first port from the virtual topology discovery device to the virtual function for the compute element, messages sent from the compute node on the first port will be directed to the virtual function for the compute element.

During the configuration stage, once the virtual topology discovery device is no longer mapped to a port, the virtual topology discovery device may remain active or be removed. If the virtual topology discovery device remains active, the virtual topology discovery device may monitor the available endpoints connected to the interconnect switch, and provide that information to the management controller (208) or pod manager.

Figure 5:
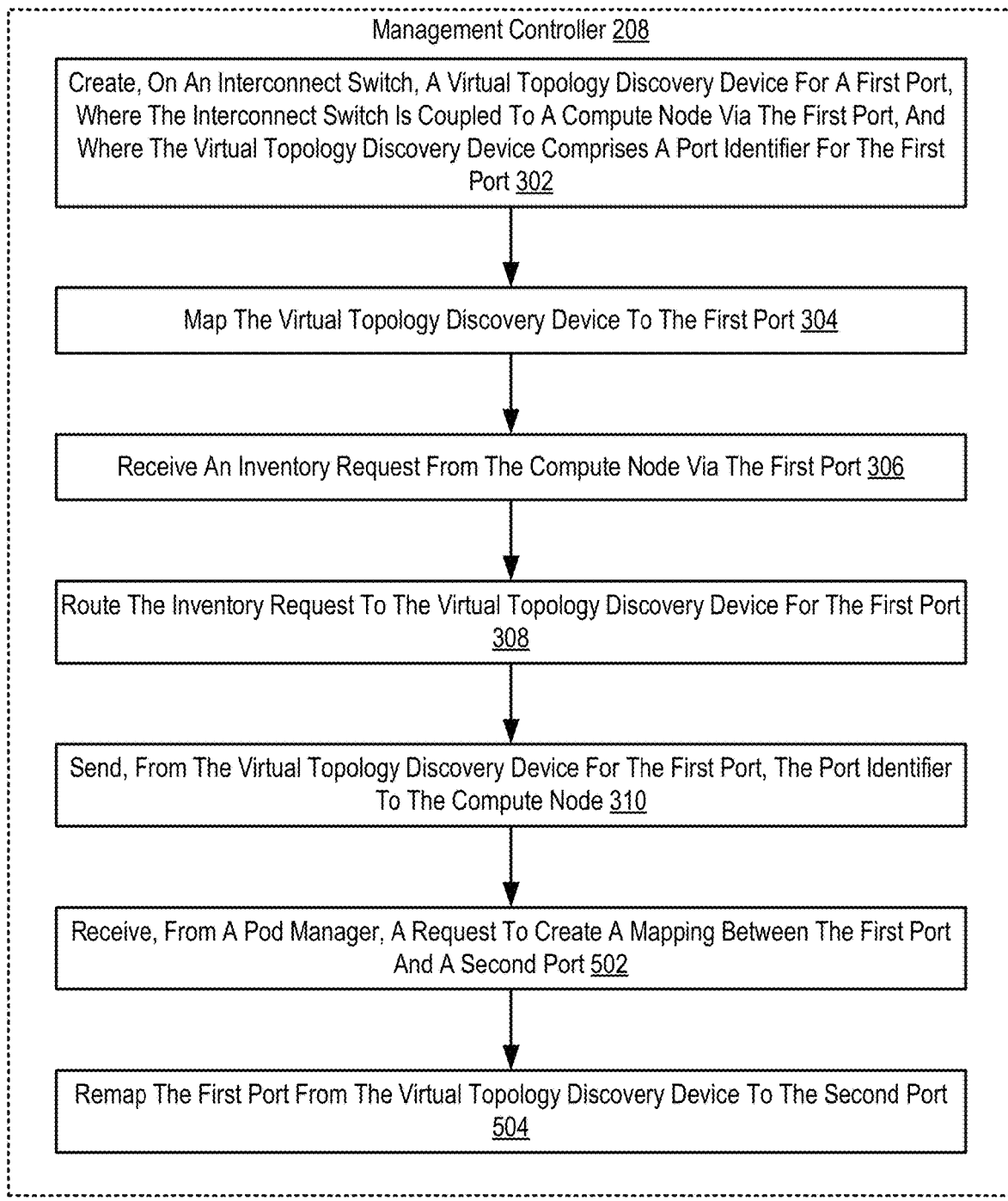
FIG. 5 sets forth a flow chart illustrating an exemplary method for topology discovery between compute nodes and interconnect switches according to embodiments of the present invention.

For further explanation, FIG. 5 sets forth a flow chart illustrating a further exemplary method for topology discovery between compute nodes and interconnect switches according to embodiments of the present invention that includes creating (302), on an interconnect switch, a virtual topology discovery device for a first port, wherein the interconnect switch is coupled to a compute node via the first port, and wherein the virtual topology discovery device comprises a port identifier for the first port; mapping (304) the virtual topology discovery device to the first port; receiving (306) an inventory request from the compute node via the first port; routing (308) the inventory request to the virtual topology discovery device for the first port; and sending (310), from the virtual topology discovery device for the first port, the port identifier to the compute node.

The method of FIG. 5 differs from the method of FIG. 3, however, in that the method of FIG. 5 further includes receiving (502), from a pod manager, a request to create a mapping between the first port and a second port; and remapping (504) the first port from the virtual topology discovery device to the second port.

Receiving (502), from a pod manager, a request to create a mapping between the first port and a second port may be carried out by the management controller receiving a request as part of the composing of a composed system. The request may be received during a configuration stage, which may be subsequent to the discovery stage. The request may be in service of creating a communicative coupling between compute nodes coupled to the interconnect switch via different ports.

Remapping (504) the first port from the virtual topology discovery device to the second port may be carried out by disabling a communicative coupling between the compute node coupled to the first port and the virtual topology discovery device, and enabling a communicative coupling between the compute node coupled to the first port and a compute node coupled to the second port. Upon remapping (504) the first port from the virtual topology discovery device to the second port, messages sent from the compute node on the first port will be directed to the compute node on the second port.

In view of the explanations set forth above, readers will recognize that the benefits of topology discovery between compute nodes and interconnect switches according to embodiments of the present invention include:
- Improving the operation of a computing system by providing greater visibility to connection information on an interconnect switch to compute nodes and a pod manager, increasing computing system functionality.
- Improving the operation of a computing system by providing connection information to compute nodes attached to an interconnect switch without power cycling or user interaction, increasing computing system efficiency.

Exemplary embodiments of the present invention are described largely in the context of a fully functional computer system for topology discovery between compute nodes and interconnect switches. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by program instructions on a computing device,
   creating, on an interconnect switch, a virtual topology discovery device for a first port on the interconnect switch, wherein the first port on the interconnect switch is configured to connect a single compute node to the interconnect switch, wherein the interconnect switch is coupled to the compute node via the first port, wherein the virtual topology discovery device is a virtual device that comprises a port identifier for the first port and information describing other available endpoints within the interconnect switch, and wherein the virtual topology discovery device is a function within firmware for one selected from a group consisting of the interconnect switch and a management controller within an interconnect switch enclosure;
   mapping the virtual topology discovery device to the first port;
   receiving an inventory request from the compute node via the first port;
   routing the inventory request to the virtual topology discovery device for the first port; and
   sending, from the virtual topology discovery device for the first port, the port identifier to the compute node.

2. The method of claim 1, further comprising:
   receiving, from a pod manager, a request to create a mapping between the first port and a compute element coupled to the interconnect switch; and
   remapping the first port from the virtual topology discovery device to the compute element coupled to the interconnect switch.

3. The method of claim 2, wherein remapping the first port from the virtual topology discovery device to the compute element coupled to the interconnect switch comprises:
   creating a virtual function for the compute element; and
   remapping the first port from the virtual topology discovery device to the virtual function for the compute element.

4. The method of claim 1, further comprising:
   receiving, from a pod manager, a request to create a mapping between the first port and a second port; and
   remapping the first port from the virtual topology discovery device to the second port.

5. The method of claim 1, wherein the virtual topology discovery device is one of a plurality of virtual topology discovery devices, and wherein each of the plurality of virtual topology discovery devices is associated with a different port of the interconnect switch.

6. The method of claim 1, wherein the compute node provides, to a pod manager, the port identifier of the first port on the interconnect switch.

7. An apparatus comprising a computing device, a computer processor, and a computer memory operatively coupled to the computer processor, the computer memory having disposed within it computer program instructions that, when executed by the computer processor, cause the apparatus to carry out the steps of:
   creating, on an interconnect switch, a virtual topology discovery device for a first port on the interconnect switch, wherein the first port on the interconnect switch is configured to connect a single compute node to the interconnect switch, wherein the interconnect switch is coupled to the compute node via the first port, and wherein the virtual topology discovery device is a virtual device that comprises a port identifier for the first port and information describing other available endpoints within the interconnect switch, and wherein the virtual topology discovery device is a function within firmware for one selected from a group consisting of the interconnect switch and a management controller within an interconnect switch enclosure;
mapping the virtual topology discovery device to the first port;
receiving an inventory request from the compute node via the first port;
routing the inventory request to the virtual topology discovery device for the first port; and
sending, from the virtual topology discovery device for the first port, the port identifier to the compute node.

8. The apparatus of claim 7, wherein the computer program instructions further cause the apparatus to carry out the step of:
receiving, from a pod manager, a request to create a mapping between the first port and a compute element coupled to the interconnect switch; and
remapping the first port from the virtual topology discovery device to the compute element coupled to the interconnect switch.

9. The apparatus of claim 8, wherein remapping the first port from the virtual topology discovery device to the compute element coupled to the interconnect switch comprises:
creating a virtual function for the compute element; and
remapping the first port from the virtual topology discovery device to the virtual function for the compute element.

10. The apparatus of claim 7, wherein the computer program instructions further cause the apparatus to carry out the step of:
receiving, from a pod manager, a request to create a mapping between the first port and a second port; and
remapping the first port from the virtual topology discovery device to the second port.

11. The apparatus of claim 7, wherein the virtual topology discovery device is one of a plurality of virtual topology discovery devices, and wherein each of the plurality of virtual topology discovery devices is associated with a different port of the interconnect switch.

12. The apparatus of claim 7, wherein the compute node provides, to a pod manager, the port identifier of the first port on the interconnect switch.

13. The apparatus of claim 7, wherein the virtual topology discovery device further comprises a switch identifier for the interconnect switch.

14. A computer program product including a non-transitory computer readable storage medium, the computer program product comprising computer program instructions that, when executed, cause a computer to carry out the steps of:
creating, on an interconnect switch, a virtual topology discovery device for a first port on the interconnect switch, wherein the first port on the interconnect switch is configured to connect a single compute node to the interconnect switch, wherein the interconnect switch is coupled to the compute node via the first port, and wherein the virtual topology discovery device is a virtual device that comprises a port identifier for the first port and information describing other available endpoints within the interconnect switch, and wherein the virtual topology discovery device is a function within firmware for one selected from a group consisting of the interconnect switch and a management controller within an interconnect switch enclosure;
mapping the virtual topology discovery device to the first port;
receiving an inventory request from the compute node via the first port;
routing the inventory request to the virtual topology discovery device for the first port; and
sending, from the virtual topology discovery device for the first port, the port identifier to the compute node.

15. The computer program product of claim 14, wherein the computer program instructions further cause the computer to carry out the step of:
receiving, from a pod manager, a request to create a mapping between the first port and a compute element coupled to the interconnect switch; and
remapping the first port from the virtual topology discovery device to the compute element coupled to the interconnect switch.

16. The computer program product of claim 15, wherein remapping the first port from the virtual topology discovery device to the compute element coupled to the interconnect switch comprises:
creating a virtual function for the compute element; and
remapping the first port from the virtual topology discovery device to the virtual function for the compute element.

17. The computer program product of claim 14, wherein the computer program instructions further cause the computer to carry out the step of:
receiving, from a pod manager, a request to create a mapping between the first port and a second port; and
remapping the first port from the virtual topology discovery device to the second port.

18. The computer program product of claim 14, wherein the virtual topology discovery device is one of a plurality of virtual topology discovery devices, and wherein each of the plurality of virtual topology discovery devices is associated with a different port of the interconnect switch.

19. The computer program product of claim 14, wherein the virtual topology discovery device further comprises, in addition to the port identifier, other information describing available compute nodes downstream from the interconnect switch.

* * * * *